(12) United States Patent
Mizuno et al.

(10) Patent No.: US 6,666,302 B2
(45) Date of Patent: Dec. 23, 2003

(54) PARKING BRAKE DEVICE INCLUDING PIVOTABLE BRAKE LEVER WHICH EXTENDS THROUGH APERTURE OF BACKING PLATE

(75) Inventors: Mitsuyasu Mizuno, Anjo (JP); Naomi Mitsuoka, Toyota (JP)

(73) Assignee: Hosei Brake Ind. Co., Ltd., Toyota (JP)

( * ) Notice: Subject to any disclaimer, the term of this patent is extended or adjusted under 35 U.S.C. 154(b) by 0 days.

(21) Appl. No.: 10/462,610

(22) Filed: Jun. 17, 2003

(65) Prior Publication Data

US 2003/0205436 A1 Nov. 6, 2003

Related U.S. Application Data

(62) Division of application No. 10/028,696, filed on Dec. 28, 2001.

(30) Foreign Application Priority Data

Jul. 13, 2001 (JP) ........................................ 2001-213604

(51) Int. Cl.$^7$ ................................................ F16D 51/00
(52) U.S. Cl. ..................... 188/2 D; 188/78; 188/106 P; 188/325
(58) Field of Search ...................... 188/325, 78, 106 P, 188/106 F, 329, 330, 2 D; 74/102, 101, 105; 403/50; 277/391, 634, 637

(56) References Cited

U.S. PATENT DOCUMENTS

| | | |
|---|---|---|
| 2,758,680 A | 8/1956 | Rabe |
| 3,991,861 A | 11/1976 | Hayashida |
| 4,757,882 A | 7/1988 | Idesawa |
| 4,887,698 A | 12/1989 | Hunt et al. |
| 5,058,713 A | * 10/1991 | Evans ..................... 188/79.54 |
| 5,400,882 A | 3/1995 | Weiler et al. |
| 5,529,149 A | 6/1996 | Johannesen et al. |
| 5,531,298 A | 7/1996 | Brooks et al. |
| 6,206,148 B1 | 3/2001 | Capek et al. |
| 6,390,248 B1 | 5/2002 | Ikeda |
| 6,412,609 B2 | 7/2002 | Asai |
| 6,510,928 B2 | 1/2003 | Asai |

* cited by examiner

Primary Examiner—Jack Lavinder
Assistant Examiner—Benjamin A. Pezzlo
(74) Attorney, Agent, or Firm—Oliff & Berridge, PLC

(57) ABSTRACT

A parking brake device for a vehicle, including: (a) a backing plate which is fixed to a body of the vehicle such that the backing plate is held substantially perpendicular to an axis of a wheel of the vehicle; (b) first and second arcuate brake shoes which are disposed on one of opposite sides of the backing plate such that the first and second arcuate brake shoes are movable toward and away from each other; (c) a moving mechanism which is positioned between the first and second arcuate brake shoes and which includes a pivotable brake lever, the moving mechanism moving the first and second arcuate brake shoes away from each other when the brake lever is pivoted in a predetermined direction; and (d) an operable member which is connected to the brake lever and which is operable by an operator of the vehicle to pivot the brake lever in the predetermined direction, wherein the brake lever has a connected portion at which the brake lever is connected to the operable member, and wherein the brake lever extends through an aperture which is formed through the backing plate such that the connected portion is positioned on the other of the opposite sides of the backing plate.

7 Claims, 6 Drawing Sheets

PRIOR ART

FIG. 7

PRIOR ART

… (body

PARKING BRAKE DEVICE INCLUDING PIVOTABLE BRAKE LEVER WHICH EXTENDS THROUGH APERTURE OF BACKING PLATE

This is a Division of application Ser. No. 10/028,696 filed Dec. 28, 2001. The entire disclosure of the prior application is hereby incorporated by reference herein in its entirety.

BACKGROUND OF THE INVENTION

1. Field of the Invention

This invention relates in general to a parking brake device for a vehicle. More particularly, this invention is concerned with a parking brake device which has provision for facilitating connection of an operable member such as a parking brake cable, with a member of the parking brake device such as a pivotable brake lever, and which is capable of generating a braking force with a high ratio of the generated braking force with respect to a driving or operating force that is applied to the operable member.

2. Discussion of the Related Art

There is known a parking brake device for a vehicle, including: (a) a backing plate which is fixed to a body of the vehicle such that the backing plate is held substantially perpendicular to an axis of a wheel of the vehicle; (b) first and second arcuate brake shoes which are disposed on one of opposite sides of the backing plate such that the first and second arcuate brake shoes are movable toward and, away from each other; (c) a moving mechanism which is positioned between the first and second arcuate brake shoes and which includes a pivotable brake lever, the moving mechanism moving the first and second arcuate brake shoes away from each other when the brake lever is pivoted in a predetermined direction; and (e) an operable member which is connected to the brake lever and which is operable by an operator of the vehicle to cause the brake lever to be pivoted in the above-described predetermined direction.

Figure 6:
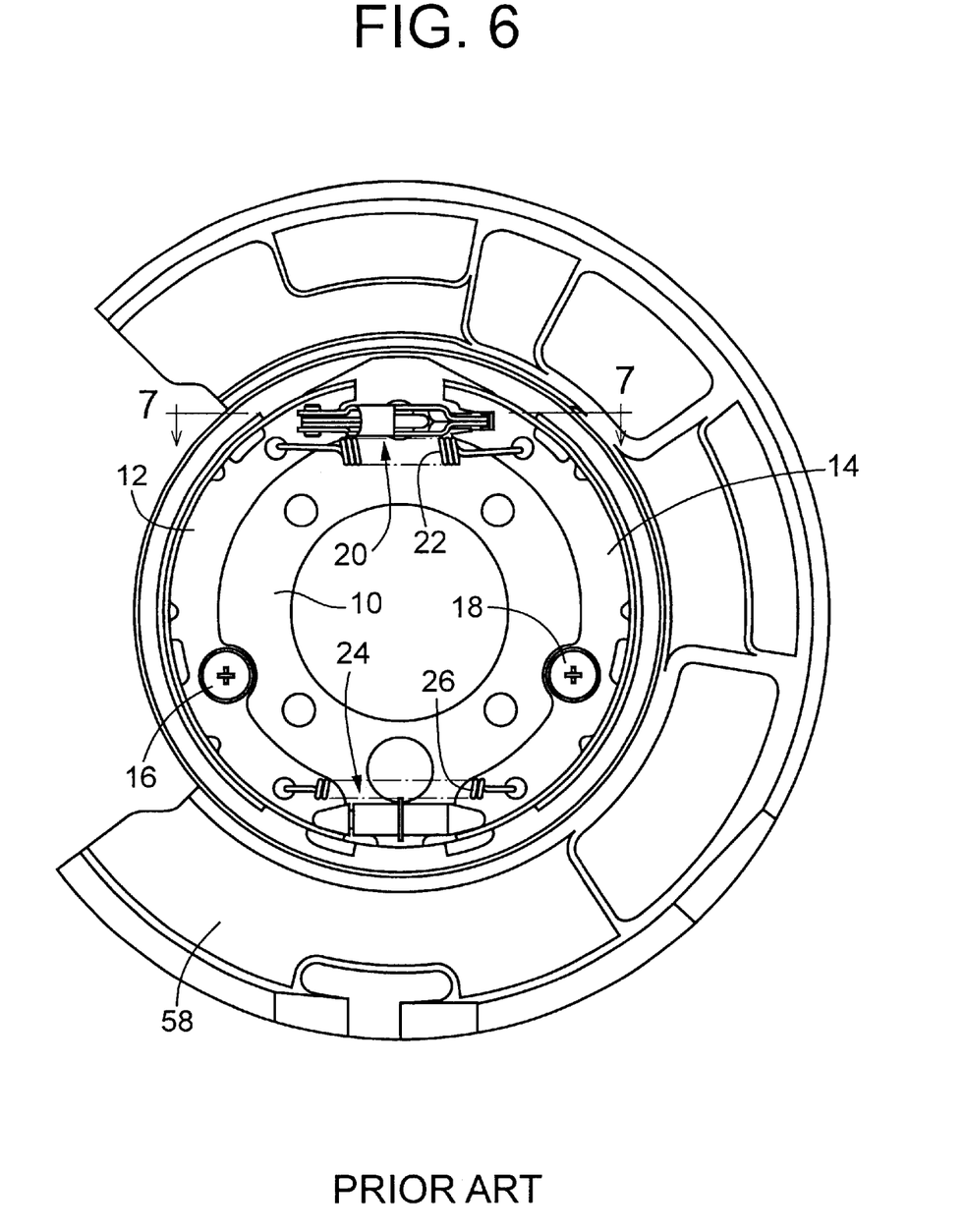
FIG. 6 is a front elevational view schematically showing a conventional drum-in-disk brake assembly to which the principle of the present invention is advantageously applicable.
Figure 7:
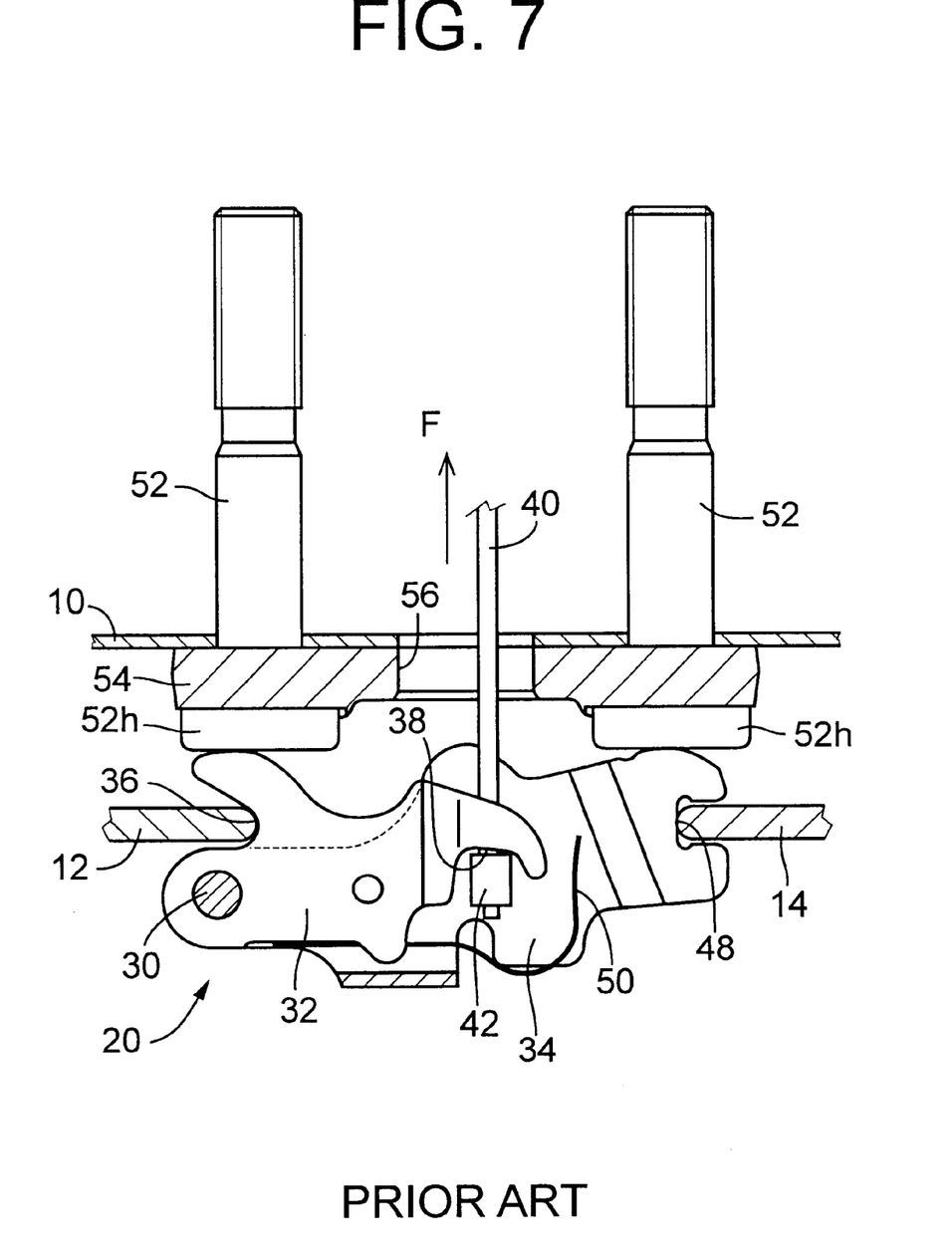
FIG. 7 is a cross sectional view taken along line 7—7 of FIG. 6.

FIGS. 6 and 7 illustrate an example of the above-described known parking brake device in the form of a so-called "drum-in-disk brake assembly" including a disk brake and a drum brake which is built in the disk brake. In such a drum-in-disk brake assembly, the disk brake serves as a service brake to be activated mainly during running of the vehicle, while the drum brake serves as a parking brake. This illustrated drum-in-disk brake assembly is designed to be provided in an automotive vehicle, for braking a right wheel of the vehicle. FIG. 6 is a front elevational view of the brake. A forward direction of the vehicle corresponds to the rightward direction as seen in FIG. 6. FIG. 7 is a cross sectional view taken along line 7—7 of FIG. 6. The brake includes a backing plate 10 which is fixed to a body of the vehicle such that the backing plate 10 is held substantially perpendicular to an axis of a wheel (not shown) of the vehicle; first and second arcuate brake shoes 12, 14 which are disposed substantially symmetrically with each other along respective circumferential portions of a periphery of the backing plate 10; and hold-down devices 16, 18 which hold the respective two arcuate brake shoes 12, 14 such that the two arcuate brake shoes 12, 14 are movable toward and away from each other. The brake shoes 12, 14 have a first pair of adjacent portions each of which is provided by a lower end portion (as seen in FIG. 6) of the corresponding brake shoe 12, 14, and a second pair of adjacent portions each of which is provided by an upper end portion (as seen in FIG. 6) of the corresponding brake shoe 12, 14. A toggle-type moving mechanism 20 and a tension coil spring 22 (which serves as a return spring) are provided between the upper end portions of the respective brake shoes 12, 14, and extend substantially in the horizontal direction as seen in FIG. 6. A strut 24 and a tension coil spring 24 are provided between the lower end portions of the respective brake shoes 12, 14, and extend substantially in the horizontal direction. The strut 24 is longitudinally expansible and contractible by means of screw connection of two component parts thereof, so that the length of the strut 24 is adjusted by a shoe-wear compensating mechanism.

As shown in FIG. 7, the moving mechanism 20 includes a connecting pin 30 which is held substantially parallel to the backing plate 10, and first and second levers 32, 34 which are connected at their respective end portions with each other through the connecting pin 30 such that the first and second levers 32, 34 are pivotable relative to each other. The first lever 32 consists of two metallic plates which are superposed on each other. The two metallic plates are held in close contact with each other in the end portion of the first lever 32 at which the first lever 32 is connected with the second lever 34, and are spaced apart from each other by a predetermined distance in the other end portion of the first lever 34. The first lever 32 has, in the end portion in which the two metallic plates are held in close contact with each other, an engaged portion (recessed portion) 36 which is held in engagement with the first brake shoe 12. The first lever 32 has, in the above-described other end portion in which the two metallic plates are spaced apart from each other, a cable-engaging portion 38 with which an engaged member 42 of a parking brake cable 40 is engaged. The engaged member 42 consists of a cylindrical member or a hexagonal prism member having a diameter larger than that of the cable 40, and is coaxially fixed to an end of the cable 40. The second lever 34 consists of a single metallic plate which is bent so as to take a substantially U shape. The first lever 32 is disposed inside the second lever 34, namely, interposed between two mutually opposed portions of the second lever 34 which are opposed to each other as a result of the bending of the single metallic plate. The two mutually opposed portions of the second lever 34 are held in close contact with each other in the other end portion of the second lever 34 which is opposite to the end portion at which the second lever 34 is connected with the first lever 32 through the connecting pin 30. The second lever 34 has, in this other end portion, an engaged portion (recessed portion) 48 which is held in engagement with the second brake shoe 14.

To the second lever 34, there is fixed a plate spring 50 which is bent so as to take a predetermined shape as shown in FIG. 7. The plate spring 50 is provided to serve as a guiding member for guiding the engaged member 42 of the cable 40 into engagement with the cable-engaging portion 38 of the first lever 32, and also to prevent the engaged member 42 once engaged with the cable-engaging portion 38, from being disengaged from the cable-engaging portion 38. It is noted that the first lever 32 serves as the above-described brake lever, and that the parking brake cable 40 serves as the operable member.

The moving mechanism 20 is held in contact with a head portion 52h of each of a plurality of bolts 52 which are provided to fix an anchor member 54 and the backing plate 10 to a carrier (not shown), of the vehicle. Each of the anchor member 54 and the backing plate 10 has an aperture 56 through which the parking brake cable 40 is introduced into the interior of the drum-in-disk brake assembly. The first lever 32 is positioned relative to the backing plate 10 such that the cable-engaging portion 38 is substantially aligned with the aperture 56 as viewed in a direction perpendicular to the baking plate 10. In this arrangement, the cable 40 can be connected to the first lever 32, simply introducing the end portion of the cable 40 with the engaged member 42, through the aperture 56 from the exterior of the drum-in-disk brake assembly (i.e, from the upper side of the backing plate 10 as seen in FIG. 7) to the interior of the drum-in-disk brake assembly. That is, the engaged member 42, fixed to the introduced end portion of the cable 40, is guided by sliding contact with the plate spring 50 so as to be brought into engagement with the cable-engaging portion 38 of the first lever 32.

When the parking brake cable 40 thus connected to the cable-engaging portion 38 is pulled by an operation of an operator-controlled operation member (e.g., an operating lever) which is provided in a passengers' compartment of the vehicle, in a direction indicated by the arrow F, i.e., in the upward direction as seen in FIG. 7, the first lever 32 is pivoted about the connecting pin 30 in the counterclockwise direction as seen in FIG. 7, whereby the first brake shoe 12 is displaced in the outward direction, i.e., in the leftward direction as seen in FIG. 7. The leftwardly displaced first brake shoe 12 is forced onto a disk rotor (not shown), for thereby generating a braking force for braking the wheel rotating with the disk rotor. The connecting pin 30 is displaced relative to the first brake shoe 12 in the rightward direction as shown in FIG. 7, by a reaction force which resists the outward displacement of the first brake shoe 12. The rightward displacement of the connecting pin 30 causes the second lever 34 to be displaced in the rightward direction, whereby the second brake shoe 14 is displaced in the outward direction, i.e., in the rightward direction. The rightwardly displaced second brake shoe 14 is forced onto the disk rotor, for thereby generating a braking force for braking the wheel rotating with the disk rotor. The disk rotor consists of a disk portion and a cylindrical drum portion which is positioned radially inwardly of the disk portion. The outwardly displaced first and second brake shoes 12, 14 are forced onto an inner circumferential surface of the cylindrical drum portion of the disk rotor. It is noted that a dust cover 58 is fixed to the backing plate 10 so as to extend radially outwardly from the periphery of the backing plate 10.

The conventional parking brake device constructed as described above is not necessarily satisfactory in cost of manufacture of the brake device, due to the provision of the guiding member in the form of the plate spring 50 which leads to an increase in the number of the required components of the brake device. Further, the plate spring 50 does not satisfactorily facilitate an operation for bringing the parking brake cable 40 into engagement with the cable-engaging portion 38 of the first lever 32. Still further, in the above-described parking brake device in which the parking brake cable 40 has to be pulled in the direction substantially perpendicular to the backing plate 10, the first and second levers 32, 34 are pressed against a supporting portion in the form of the head portions 52h of the bolts 52 which serves to support the moving mechanism 60, whereby friction forces acting between the levers 32, 34 and the head portions 52h are increased. The sliding movements of the first and second levers 32, 34 relative to the head portions 52h are resisted by the increased friction forces, thereby resulting in an undesirable reduction in a ratio of the generated braking force with respect to a driving or operating force which is applied to the operable member.

SUMMARY OF THE INVENTION

It is therefore an object of the present invention to provide a parking brake device which has provision for enabling an operable member such as a parking brake cable to be easily connected to a brake lever without an additional member such as a guiding member, and which is capable of generating a braking force with a high ratio of the generated braking force with respect to a driving or operating force which is applied to the operable member. This object may be achieved according to any one of first through ninth aspects of this invention which are described below.

The first aspect of the invention provides a parking brake device for a vehicle, comprising: (a) a backing plate which is fixed to a body of the vehicle such that the backing plate is held substantially perpendicular to an axis of a wheel of the vehicle; (b) first and second arcuate brake shoes which are disposed on one of opposite sides of the backing plate such that the first and second arcuate brake shoes are movable toward and away from each other; (c) a moving mechanism which is positioned between the first and second arcuate brake shoes and which includes a pivotable brake lever, the moving mechanism moving the first and second arcuate brake shoes away from each other when the brake lever is pivoted in a predetermined direction; and (d) an operable member which is connected to the brake lever and which is operable by an operator of the vehicle to pivot the brake lever in the predetermined direction, wherein the brake lever has a connected portion at which the brake lever is connected to the operable member, and wherein the brake lever extends through an aperture which is formed through the backing plate such that the connected portion is positioned on the other of the opposite sides of the backing plate.

The second aspect of the invention provides a parking brake device for a vehicle, comprising: (a) a backing plate (10) which is fixed to a body of the vehicle such that the backing plate is held substantially perpendicular to an axis of a wheel of the vehicle; (b) first and second arcuate brake shoes which are disposed on one of opposite sides of the backing plate such that the first and second arcuate brake shoes are movable toward and away from each other; (c) a moving mechanism including first and second levers which are engaged with the first and second arcuate brake shoes, and which are connected with each other through a connecting pin that is held substantially parallel to the backing plate, such that the first and second levers are pivotable relative to each other about the connecting pin, the moving mechanism moving the first and second arcuate brake shoes away from each other when the first lever is pivoted about the connecting pin in a predetermined direction; and (d) an operable member which is connected to the first lever and which is operable by an operator of the vehicle to pivot the first lever about the connecting pin in the predetermined direction, wherein the first lever has a connected portion at which the first lever is connected to the operable member, and wherein the first lever extends through an aperture which is formed through the backing plate such that the connected portion is positioned on the other of the opposite sides of the backing plate.

According to the third aspect of the invention, the parking brake device defined in the second aspect of the invention further comprises a cover which is made of an elastic material, and which covers a space between the first lever and the aperture while permitting the first lever to be pivoted about the connecting pin, wherein the cover has an engageable portion which is engageable with the first lever, for limiting a movement of the first lever in a direction perpendicular to the predetermined direction.

According to the fourth aspect of the invention, in the parking brake device defined in the second or third aspect of the invention, the operable member is a parking brake cable which is connected at one of opposite end portions thereof to the first lever and which is connected at the other of the opposite end portions to an operating lever provided in a passengers' compartment of the vehicle.

According to the fifth aspect of the invention, in the parking brake device defined in any one of the second through fourth aspects of the invention, the first lever is engaged at an engaged portion thereof with the first arcuate brake shoe, and wherein a distance between the connected portion and the connecting pin is at least five times as large as a distance between the engaged portion and the connecting pin.

According to the sixth aspect of the invention, in the parking brake device defined in any one of the second through fifth aspects of the invention, the operable member applies a force to the first lever such that the force acts on the first lever in a direction that is inclined with respect to a plane parallel to the the backing plate by an angle of 5°–30° toward a longitudinally-extending center line of the body of the vehicle.

According to the seventh aspect of the invention, the parking brake device defined in any one of the second through sixth aspects of the invention, the operable member applies a tensile force to the first lever such that the tensile force acts on the first lever in a force-acting direction that is inclined with respect to a plane parallel to the backing plate by an angle of 5°–30° in such a direction that causes the first lever to be forced toward a longitudinally-extending center line of the body of the vehicle when the tensile force is applied to the first lever by the operable member.

According to the eighth aspect of the invention, in the parking brake device defined in the sixth or seventh aspect of the invention, the connected portion is positioned such that the direction is substantially perpendicular to a straight line connecting the connected portion and the connecting pin.

According to the ninth aspect of the invention, in the parking brake device defined in any one of the second through fifth aspects of the invention, the operable member applies a force to the first lever such that the force acts on the first lever in a force-acting direction that is substantially perpendicular to a plane parallel with the backing plate.

In the above-described parking brake device constructed according to the first aspect of the invention, the brake lever extends through the aperture of the backing plate such that the connected portion of the brake lever is positioned on the above-described other of the opposite sides of the backing plate, namely, such that the connected portion of the brake lever projects from the aperture towards the body of the vehicle. This arrangement facilitates an operation for connecting the operable member to the brake lever, and also makes it possible to eliminate a conventionally required guiding member, leading to reduction in the number of the required components of the parking brake device and consequent reduction in the cost of manufacture of the device. Further, the positioning of the connected portion of the brake lever on the above-described other of the opposite sides of the backing plate is effective to increase a degree of freedom in determining a force-acting direction in which a driving or operating force applied through the operable member acts on the brake lever, thereby making it possible to install the parking brake device in various types of vehicles, and also to increase a ratio of a braking force (generated by the parking brake device) with respect to the operating or driving force (applied to the operable member). The increased ratio of the braking force with respect to the driving force means that a relatively large braking force can be generated by even a relatively small operating or driving force applied to the operable member.

In the above-described parking brake device constructed according to the second aspect of the invention, the first lever extends through the aperture of the backing plate such that the connected portion of the first lever is positioned on the above-described other of the opposite sides of the backing plate, namely, such that the connected portion of the second lever projects from the aperture towards the body of the vehicle. This arrangement facilitates an operation for connecting the operable member to the brake lever, and also makes it possible to eliminate a conventionally required guiding member, leading to reduction in the number of the required components of the parking brake device and consequent reduction in the cost of manufacture of the device. Further, the positioning of the connected portion of the first lever on the above-described other of the opposite sides of the backing plate is effective to increase a degree of freedom in determining the force-acting direction in which the driving or operating force applied through the operable member acts on the first lever, thereby making it possible to install the parking brake device in various types of vehicles. Where the force-acting direction is adapted to be close to the direction in which the first and second arcuate brake shoes are movable away from each other, it is possible to reduce friction force acting between the moving mechanism and the supporting portion which supports the moving mechanism, thereby increasing the above-described ratio of the braking force with respect to the driving force. The increased ratio of the braking force with respect to the driving force means that a relatively large braking force can be generated by even a relatively small driving force, e.g., a relatively small operating force applied to an operator-controlled operation member (e.g., an operating lever) which is provided in a passengers' compartment of the vehicle. It is noted that this second aspect of the invention corresponds to one embodied form of the above-described first aspect of the invention, and that the first lever defined in this second aspect of the invention corresponds to the brake lever defined in the first aspect of the invention.

In the above-described parking brake device constructed according to the third aspect of the invention, the engageable portion is formed integrally with the other portion of the cover which covers the space between the first lever and the aperture, so that backlash movement of the first lever in the direction perpendicular to the above-described predetermined direction can be limited by engagement of the engageable portion with the first lever. In this arrangement, it is possible to prevent abutting contact of the first lever with an edge of the aperture, i.e., abutting contact of metallic members with each other, for example, when the vehicle body is vibrated during running of the vehicle. Thus, generation of unpleasant noise which would be caused in the event of the abutting contact of the metallic members is advantageously avoided.

In the above-described parking brake device constructed according to the sixth aspect of the invention, the operable member applies a tensile or pressing force to the first lever such that the tensile or pressing force acts on the first lever in the force-acting direction which is inclined with respect to the plane parallel to the backing plate by the angle of 5°–30° toward the longitudinally-extending center line of the vehicle body, namely, which is close to the direction in which the brake shoes are movable away from each other. This arrangement is effective to increase the above-described ratio of the generated braking force with respect to the driving force, whereby a relatively large braking force can be generated by even a relatively small driving force. Further, since the force-acting direction is inclined with respect to the above-described plane by at least 5° toward the center line of the vehicle body, the moving mechanism (including the first lever) is forced toward the backing plate by a certain amount of force, without the moving mechanism being displaced away from the backing plate upon activation of the parking brake device, i.e., without a risk of reduction in a braking performance of the parking brake device.

The principle of the present invention is advantageously applied, particularly, to the parking brake device as defined in the second aspect of the invention. However, the principle of the invention can be applied to other various types of parking brake devices such as a strut-type parking brake device in which a brake lever is attached to one of the brake shoes or a strut such that the brake lever is pivotable about a connecting pin that is substantially perpendicular to the backing plate so that the brake shoes are moved away from each other by a link mechanism constituted by the brake lever and the strut.

The parking brake device of the invention is advantageously used as a drum brake which constitutes a part of a drum-in-disk brake assembly as shown in FIG. 6, and which serves as a parking brake device. However, the parking brake device of the invention can constitute also a part of a drum brake assembly which functions as a service brake as well as a parking brake, so that the parking brake device of the invention provides the drum brake assembly with a function of the parking brake. Further, while the moving mechanism is held substantially in the horizontal posture so as to move the generally vertically extending brake shoes away from each other in the drum-in-disk brake assembly of FIG. 6, such arrangements and postures of the moving mechanism and brake shoes may be modified.

As described above, in FIG. 7, the first and second levers are connected at their respective end portions with each other through the connecting pin such that the first and second levers are pivotable relative to each other. The first lever is engaged, at the end portion at which the first lever is connected to the second lever through the connecting pin, with one of the brake shoes. The second lever is engaged at the other end portion with the other of the brake shoes. Such arrangements of the first and second levers and connecting pin may be modified, for example, such that the first and second levers extend from the connecting pin in respective directions opposite to each other so as to be engaged with the respective brake shoes.

While the connecting pin connecting the first and second levers is positioned on one of opposite sides of the brake shoe which is remote from the backing plate in FIG. 7, the connecting pin may be positioned on the other of the opposite sides of the brake shoe. Further, the parking brake device may include a member which functions as a stopper to prevent the first and second levers from being moved away from the backing plate.

It is preferable that each of the first and second levers is constituted by a single metallic plate or a plurality of metallic plates and that each of the levers is held in substantially perpendicular to the backing plate. However, each of the levers may be formed of a synthetic resin material.

The operable member is preferably constituted by the parking brake cable which is connected to a parking operation lever provided in the passengers' compartment of the vehicle, as in the fourth aspect of the invention. However, the operable member may be also constituted, for example, by a suitable link mechanism. Further, the operable member may be displaced by an operating force which is applied by the vehicle operator to the operable member, or alternatively may be displaced by a driving force which is applied by an electric motor or other drive source to the operable member. In the latter case, the drive source may be activated in response to a switching operation made by the vehicle operator, so that the operable member is displaced to be positioned in its operating position by the activation of the drive source.

The engageable portion defined in the third aspect of the invention may be constantly held in engagement or contact with the first lever, or alternatively may be brought into engagement or contact with the first lever only when the first lever is displaced more than a predetermined amount in a direction perpendicular to a pivot direction in which the first lever is to be pivoted. In the latter case, there exists a predetermined gap between the first lever and the engageable portion such that the engageable portion and the first lever are not brought into contact with each other unless the first lever is displaced more than the predetermined amount in the above-described perpendicular direction. It is possible to provide the parking brake device of the second aspect of the invention with an engageable member which functionally corresponds to the engageable portion, irrespective of whether the cover is provided in the parking brake device or not. It is also possible to provide the parking brake device of the first aspect of the invention with the cover having the engageable portion or the engageable member which function to limit the displacement of the brake lever in the direction perpendicular to the pivot direction of the brake lever.

While the force-acting direction is inclined with respect to the plane parallel to the backing plate by the angle of 5°–30° in the sixth aspect of the invention, the angle of the inclination of the force-acting direction is not particularly limited, but may be, for example, 90°.

BRIEF DESCRIPTION OF THE DRAWINGS

The above and other objects, features, advantages and technical and industrial significance of this invention will be better understood by reading the following detailed description of the presently preferred embodiments of the invention, when considered in connection with the accompanying drawings, in which.

DETAILED DESCRIPTION OF THE PREFERRED EMBODIMENTS

Referring first to FIGS. 1–4, there will be described a parking brake device constructed according to one embodiment of this invention. The same reference numerals as used in the above-described conventional parking brake device of FIGS. 6 and 7 will be used to identify the elements which are the same as or similar to those in the conventional parking brake device of FIGS. 6 and 7. No redundant description of these elements will be provided, in the interest of simplification of the description.

Figure 1:
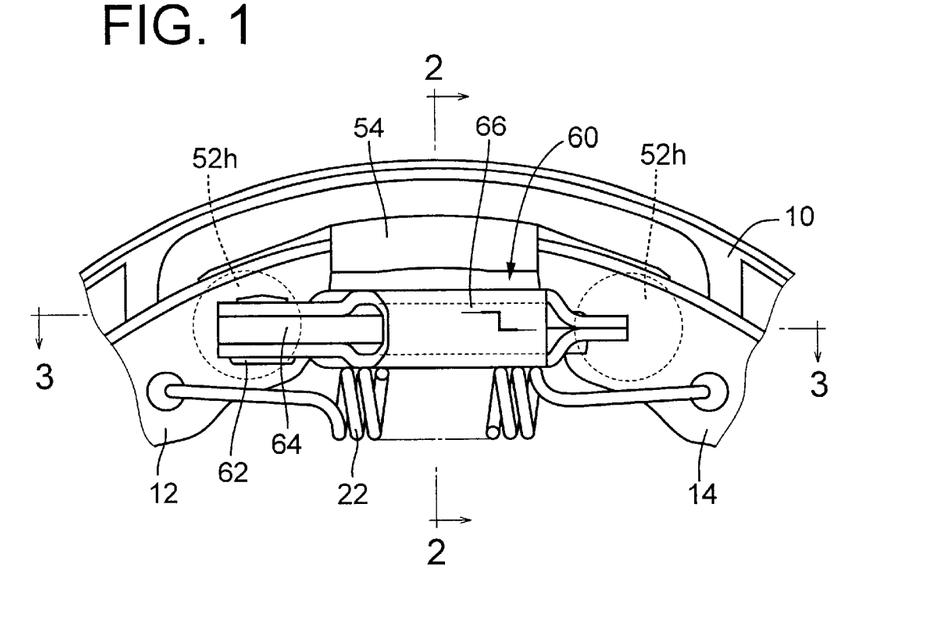
FIG. 1 is a front view showing a moving mechanism and its vicinity in a parking brake device constructed according to one embodiment of this invention.
Figure 2:
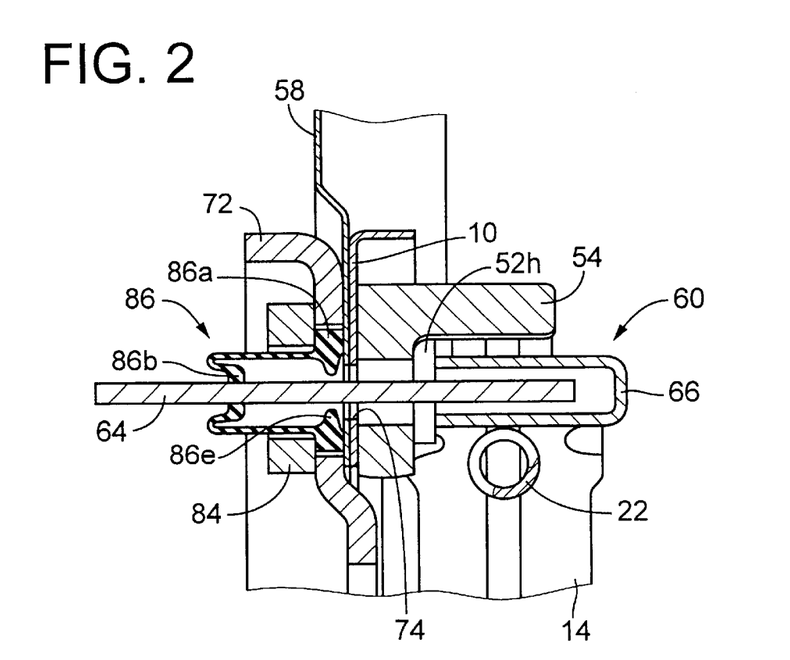
FIG. 2 is a cross sectional view taken along line 2—2 of FIG. 1.
Figure 3:
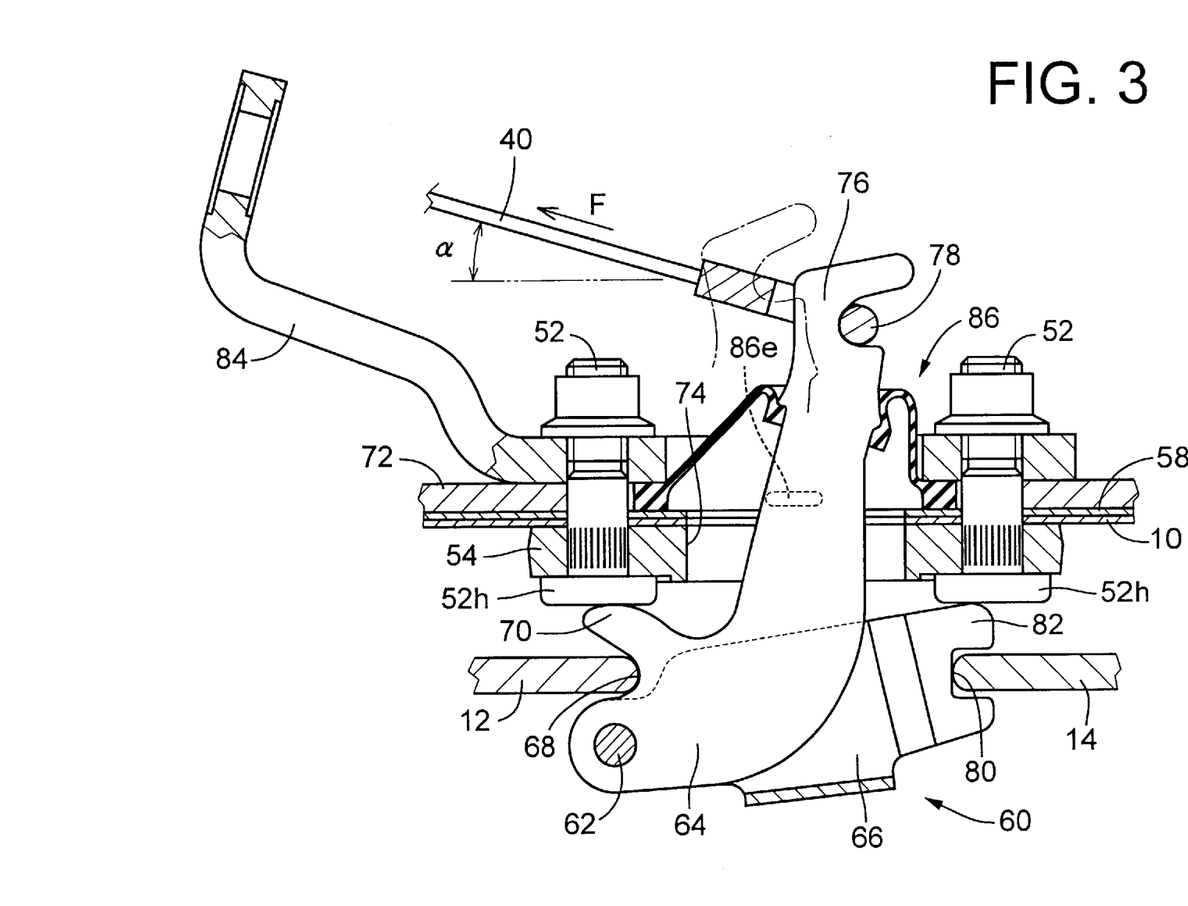
FIG. 3 is a cross sectional view taken along line 3—3 of FIG. 1.

FIG. 1 is a front view showing a toggle-type moving mechanism 60 and its vicinity in the parking brake device of the embodiment of this invention. FIG. 2 and FIG. 3 are cross sectional views taken along line 2—2 and line 3—3 of FIG. 1, respectively. The moving mechanism 60 includes a connecting pin 62, and first and second levers 64, 66 which are superposed on and parallel to each other and which are connected at their respective end portions with each other through the connecting pin 62 such that the first and second levers 64, 66 are pivotable relative to each other. The connecting pin 62 is held substantially parallel to the backing plate 10 and extends substantially in the vertical direction as seen in FIG. 1, while the first and second levers 64, 66 extend substantially in the horizontal direction as seen in FIG. 1. The first and second brake shoes 12, 14 are disposed on one of opposite sides of the backing plate 10 which is remote from the body of the vehicle, and are held in engagement at the respective end portions with the first and second levers 64, 66, respectively.

The first lever 64, consisting of a single metallic plate and serving as a brake lever, has a recessed portion 68 and an arcuate protrusion portion 70 in its end portion at which the first lever 64 is connected with the second lever 66 through the connecting pin 62. The recessed portion 68 serves as an engaged portion to be engaged with the first brake shoe 12. The arcuate protrusion portion 70 serves as a contact portion to be held in contact with the head portion 52h of a corresponding one of the bolts 52 which serve as a supporting portion for supporting the moving mechanism 60. The first lever 64 extends through an aperture 74 which is constituted by apertures formed through the respective backing plate 10, anchor member 54, dust cover 58 and carrier 72, such that the other end portion of the first lever 64 is positioned on the other of the above-described opposite sides of the backing plate 10, namely, such that the other end portion of the first lever 64 projects from the aperture 74 toward the body of the vehicle. The first lever 64 has, in a distal end of this other end portion, a connected portion 76 at which the first lever 64 is connected to a connecting member 78 of the parking brake cable 40. The second lever 66 consists of a single metallic plate which is bent so as to take a substantially U shape. The first lever 64 is disposed inside the second lever 66, namely, interposed between two mutually opposed portions of the second lever 66 which are opposed to each other as a result of the bending of the single metallic plate, as best shown in FIG. 2. The two mutually opposed portions of the second lever 66 are held in close contact with each other in the other end portion of the second lever 66 which is opposite to the end portion at which the second lever 66 is connected with the first lever 64 through the connecting pin 62, as best shown in FIG. 1. The second lever 66 has, in this other end portion, a recessed portion 80 which serves as an engaged portion held in engagement with the second brake shoe 14, and an arcuate protrusion portion 82 which serves as a contact portion held in contact with the head portion 52h of a corresponding one of the bolts 52.

The recessed portion 68 serving as the engaged portion of the first lever 64 is positioned between the connecting pin 62 and the backing plate 10, and the connecting pin 62 is positioned on one of opposite sides of the first brake shoe 12 which is remote from the backing plate 10. In this arrangement, when the parking brake cable 40 is pulled in the force-acting direction F by an operation of an operator-controlled operation member (e.g., an operating lever) which is provided in a passengers' compartment of the vehicle, the parking brake cable 40 applies a tensile force to the first lever 64. With the application of the tensile force to the first lever 64, the first lever 64 is pivoted about the connecting pin 62 in the counter-clockwise direction as seen in FIG. 3, whereby the first brake shoe 12 is displaced in the outward direction, i.e., in the leftward direction as seen in FIG. 3. The leftwardly displaced first brake shoe 12 is forced onto an inner circumferential surface of a disk rotor (not shown), for thereby generating a braking force for braking the wheel rotating with the disk rotor. The connecting pin 62 is displaced relative to the first brake shoe 12 in the rightward direction as shown in FIG. 3, by a reaction force resisting the outward or leftward displacement of the first brake shoe 12. The rightward displacement of the connecting pin 62 causes the second lever 66 to be displaced in the rightward direction, whereby the second brake shoe 14 is displaced in the outward direction, i.e., in the rightward direction. The rightwardly displaced second brake shoe 14 is forced onto the inner circumferential surface of the disk rotor, for thereby generating a braking force for braking the wheel rotating with the disk rotor. The one-dot chain line of FIG. 3 indicates a position of the connected portion 76 of the first lever 64 when the first lever 64 is pivoted to its operating position for activating the parking brake device. It is noted that the aperture 74 consists of an elongated hole whose opening is elongated in the horizontal direction rather than in the vertical direction as seen in FIG. 1, for allowing the pivot movement of the first lever 64.

The above-described force-acting direction F is adapted to be inclined with respect to a plane parallel to the backing plate 10 by a predetermined angle α, toward the longitudinally-extending center line of the vehicle body (i.e., in the upward direction as seen in FIG. 3) away from the above-described one of the opposite sides of the backing plate 10 on which the first and second brake shoes 12, 14 are disposed. The angle α is determined to be not larger than such a degree that permits the force-acting direction F to be close to the direction in which the brake shoes 12, 14 are to be moved away from each other, i.e., the horizontal direction as seen in FIG. 3, and at the same time to be not smaller than such a degree that permits the moving mechanism 60 (including the first lever 64) to be forced toward the backing plate 10 by a certain amount of force, without the moving mechanism 60 being separated from the head portions 52h of the bolts 52 upon activation of the parking brake device, i.e., without a risk of reduction in a braking performance of the parking brake device. Specifically, the angle α may be determined to be 5°–30°, for example, about 15° as in the present embodiment. In this arrangement, a ratio of a braking force (generable by the parking brake device) with respect to a driving or operating force (applied to the operable member) is advantageously increased, so that a relatively large braking force can be generated by even a relatively small driving force, e.g., a relatively small operating force applied to an operator controlled operation member which is provided in a passengers' compartment of the vehicle.

The parking braking cable 40 is enveloped or accommodated in an outer casing which is fixed to a cable guide 84. This cable guide 84 is fixed to the carrier 72 by the bolts 52 such that the cable guide 84 is positioned in a predetermined position relative to the carrier 72. The above-described force-acting direction F is defined by this predetermined position of the cable guide 84 relative to the carrier 72. Namely, the force-acting direction F can be adjustable by adjusting this predetermined position of the cable guide 84 relative to carrier 72. Further, the connected portion 76 (more specifically, a point at which the first lever 64 is held in connection or engagement with the connecting member 78) is positioned such that the force-acting direction F is substantially perpendicular to a straight line connecting the connected portion 76 and the connecting pin 62. In addition, the distance from the connecting pin 62 to the connected portion 76 is considerably larger than the distance from the connecting pin 62 to the engaged portion 68 (at which the first lever 64 is held in engagement with the first brake shoe 12), so that the driving or operating force is multiplied by a high lever ratio, whereby a sufficiently large amount of braking force is obtained. In the present embodiment, the distance from the connected portion 76 to the connecting pin 62 is at least five times as large as the distance from the engaged portion 68 to the connecting pin 62.

Figure 4A:
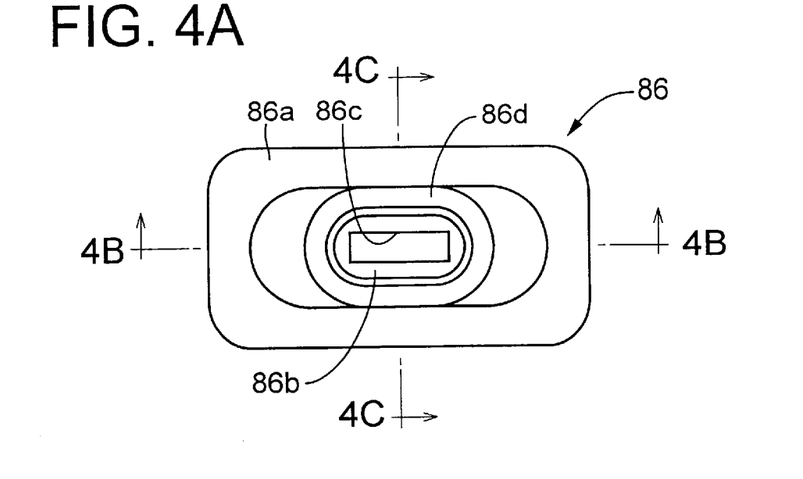
FIG. 4A is a plan view exclusively showing a cover provided in the parking brake device of FIG. 1.
Figure 4B:
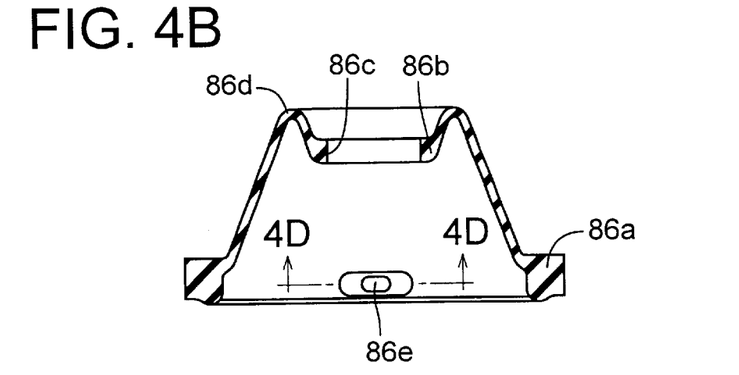
FIG. 4B is a cross sectional view taken along line 4B—4B of FIG. 4A.
Figure 4C:
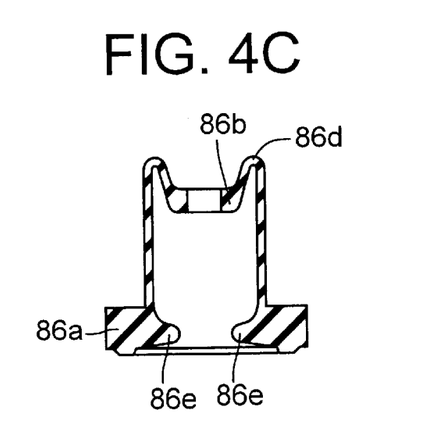
FIG. 4C is a cross sectional view taken along line 4C—4C of FIG. 4A.
Figure 4D:
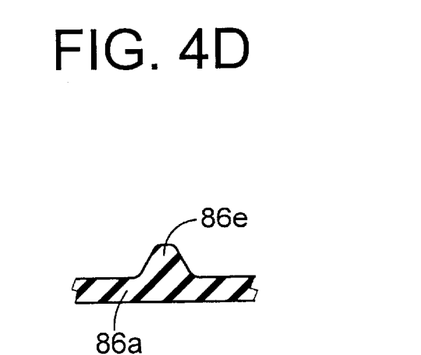
FIG. 4D is a cross sectional view taken along line 4D—4D of FIG. 4B.

A cover 86, which is made of an elastic material, e.g., a rubber material, is provided to cover a space between the first lever 64 and the aperture 74, namely, a radial spacing defined by and between the periphery of the first lever 64 and the edge of the aperture 74, while permitting the pivot movement of the first lever 64 about the connecting pin 62. FIG. 4A is a plan view exclusively showing this cover 86. FIGS. 4B and 4C are cross sectional views taken along line 4B—4B and line 4C—4C of FIG. 9A, respectively. FIG. 4D is a cross sectional view taken along line 4D—4D of FIG. 4B. The cover 86 has a truncated pyramid shape in its entirety, and includes an annular bottom end portion 86a and an upper end portion 86b. The annular bottom end portion 86a has an elongated rectangular cross section whose shape corresponds to an elongated cross sectional shape of the aperture 74, and is gripped by and between the cable guide 84 and the edge of the aperture 74 so as to be fixed relative to the backing plate 10. The upper end portion 86b is fixed to a portion of the first lever 64 which portion is adjacent to the connected portion 76, owing to an elasticity of the elastic material. The upper end portion 86b has an end face which has a concavity concaved toward the annular bottom end portion 86a. An elongated hole 86d is formed through a bottom of the concavity, namely, through a ceiling wall of the truncated-pyramid-shaped cover 86. The elongated hole 86d has a rectangular cross sectional shape corresponding to a cross sectional shape of the first lever 64. An annular protrusion 86d, which is located in the periphery of the end face of the upper end portion 86b, serves to enable the upper end portion 86b to be deformed or displaced together with the pivot movement of the first lever 64. That is, the upper end portion 86b is sufficiently displaceable in the direction of the pivot movement of the first lever 64, principally owing to elastic deformation of the annular protrusion 86d.

A pair of protrusion 86e is formed on an inner circumferential surface of a longitudinally intermediate portion of the annular bottom end portion 86a of the cover 86, as best shown in FIG. 4B. Each of the protrusions 86e has a generally trapezoidal cross sectional shape, and protrudes inwardly from the inner circumferential surface of the longitudinally intermediate portion of the annular bottom end portion 86a. As is apparent from FIG. 2, each of the protrusions 86e has a distal end which is located inwardly of the inner circumferential surface of the aperture 74. That is, the distance from the periphery of the first lever 64 to the distal end of each of the protrusions 86e is smaller than the distance from the periphery of the first lever 64 to any portion of the inner circumferential surface of the aperture 74. The protrusions 86e serve as an engageable portion which is engageable with the first lever 64, for limiting movement of the first lever 64 in a direction perpendicular to a pivot direction in which the first lever 64 is to be pivoted. Each of the protrusions 86e is elongated in the pivot direction, as shown in FIGS. 3 and 4B, and has a length sufficient to permit the first lever 64 to be engageable with the protrusion 86e in any pivoted position of the first lever 64. As shown in FIG. 2, there normally exists a predetermined gap between the first lever 64 and each of the protrusions 86e. When the first lever 64 is displaced or moved in the above-described perpendicular direction more than a predetermined distance, the first lever 64 is brought into engagement with one of the protrusions 86e, whereby the first lever 64 is prevented from being brought into abutting contact with a metallic component such as the backing plate 10.

In the parking brake device constructed according to the embodiment of the invention, the first lever 64 extends through the aperture 74 formed through the backing plate 10 and the other members such that the connected portion 76 of the first lever 64 is positioned on the above-described other of the opposite sides of the backing plate 10, namely, such that the connected portion 76 of the first lever 64 projects from the aperture 74 towards the body of the vehicle. This arrangement facilitates an operation for connecting the parking brake cable 40 to the first lever 64, and also makes it possible to eliminate a conventionally required guiding member as shown in FIG. 7, leading to reduction in the number of the required components of the parking brake device and consequent reduction in the cost of manufacture of the device.

Further, the positioning of the connected portion 76 of the first lever 64 on the above-described other of the opposite sides of the backing plate 10 is effective to increase a degree of freedom in determining the force-acting direction F in which the driving or operating force applied through the parking brake cable 40 acts on the first lever 64, thereby making it possible to install the parking brake device in various types of vehicles. Since the angle a of the inclination of the force-acting direction F is set to be about 15°, namely, the force-acting direction F is adapted to be close to the direction in which the first and second brake shoes 12, 14 are movable away from each other, it is possible to reduce a sliding resistance acting between the head portions 52h and the contact portions 70, 82, thereby increasing the above-described ratio of the braking force with respect to the driving force. Further, since the force-acting direction F is inclined with respect to the plane parallel to the backing plate 10 by at least 5° toward the longitudinally-extending center line of the vehicle body, the moving mechanism 60 including the first lever 64 is forced toward the backing plate 10 by a certain amount of force without the moving mechanism 60 being moving away from the backing plate 10 upon activation of the parking brake device, i.e., without a risk of reduction in a braking performance of the parking brake device.

Further, in the present embodiment of the invention, the connected portion 76 (more specifically, a point at which the first lever 64 is held in connection or engagement with the connecting member 78) is positioned such that the force-acting direction F is substantially perpendicular to a straight line connecting the connected portion 76 and the connecting pin 62. In addition, the distance from the connecting pin 62 to the connected portion 76 is considerably larger than the distance from the connecting pin 62 to the engaged portion 68 (at which the first lever 64 is held in engagement with the first brake shoe 12), so that the driving or tensile force is multiplied by a high lever ratio, whereby a sufficiently large amount of braking force is obtained.

Still further, the engageable portion in the form of the pair of protrusions 86e is formed integrally with the other portion of the rubber-made cover 86 which covers the space between the periphery of the first lever 64 and the edge of the aperture 74, so that backlash movement of the first lever 64 in the direction perpendicular to the pivot movement direction can be limited by engagement of the protrusions 86e with the first lever 64. Owing to this arrangement, it is possible to prevent abutting contact of the first lever 64 with the edge of the aperture 74, i.e., abutting contact of metallic members with each other, for example, when the vehicle body is vibrated during running of the vehicle. Thus, generation of unpleasant noise which would be caused in the event of the abutting contact of the metallic members is advantageously avoided.

Figure 5:
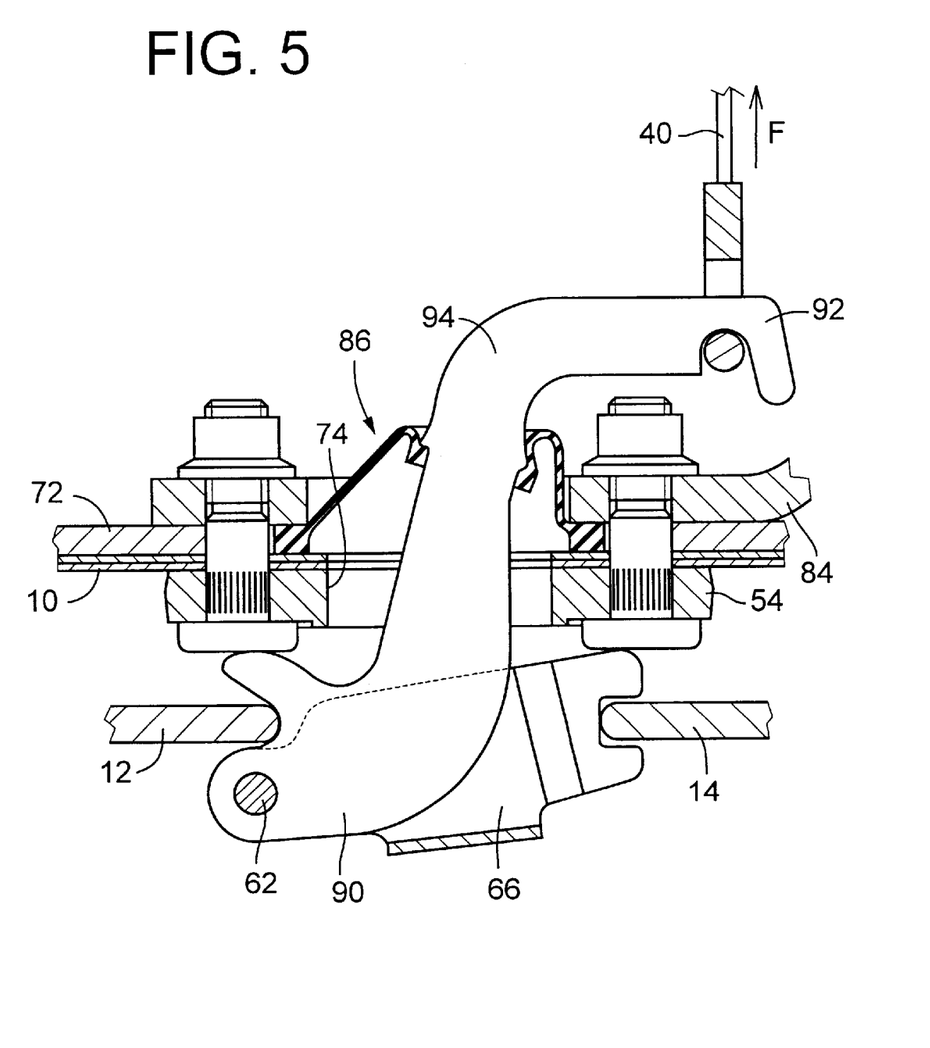
FIG. 5 is a cross sectional view showing a parking brake device constructed according to another embodiment of the invention, and taken in a line corresponding to the line 3—3 of FIG. 1.

While the angle α of the inclination of the force-acting direction F with respect to the backing plate 10 is about 15° in the above-illustrated embodiment, the angle α is not particularly limited, but may be changed suitably depending upon, for example, the type of vehicle in which the parking brake device to be installed. FIG. 5 illustrates a parking brake device constructed according to another embodiment of the invention in which the angle α is adapted to be about 90°. In this parking brake device of FIG. 5, a first lever 90 serving as the brake lever has a connected portion 92 and a curved portion 94 in which the first lever 90 is curved by about 90°. The first lever 90 extends through the aperture 74 such that the curved portion 94 as well as the connected portion 92 is positioned on the side of the backing plate 10 which is remote from the brake shoes 12, 14. The parking brake device of this embodiment is activated by pulling the parking brake 40 which is engaged with the connected portion 92 of the first lever 90, in the force-acting direction F which is substantially perpendicular to the baking plate 10.

While the presently preferred embodiments of the present invention have been illustrated above, it is to be understood that the invention is not limited to the details of the illustrated embodiments, but may be embodied with various other changes, modifications and improvements, which may occur to those skilled in the art, without departing from the spirit and scope of the invention defined in the following claims.

What is claimed is:

1. A parking brake device for a vehicle, comprising:

a backing plate which is fixed to a body of the vehicle such that said backing plate is held substantially perpendicular to an axis of a wheel of the vehicle;

first and second arcuate brake shoes which are disposed on one of opposite sides of said backing plate such that said first and second arcuate brake shoes are movable toward and away from each other;

a moving mechanism including first and second levers which are engaged with said first and second arcuate brake shoes, and which are connected with each other through a connecting pin that is held substantially parallel to said backing plate, such that said first and second levers are pivotable relative to each other about said connecting pin, said moving mechanism moving said first and second arcuate brake shoes away from each other when said first lever is pivoted about said connecting pin in a predetermined direction;

an operable member which is connected to said first lever and which is operable by an operator of the vehicle to pivot said first lever about said connecting pin in said predetermined direction, wherein said first lever has a connected portion at which said first lever is connected to said operable member, and wherein said first lever extends through an aperture which is formed through said backing plate such that said connected portion is positioned on the other of said opposite sides of said backing plate; and a cover which is made of an elastic material, and which covers a space between said first lever and said aperture while permitting said first lever to be pivoted about said connecting pin, wherein said cover has an engageable portion which is engageable with said first lever, for limiting a movement of said first lever in a direction perpendicular to said predetermined direction.

2. A parking brake device according to claim 1, wherein said operable member is a parking brake cable which is connected at one of opposite end portions thereof to said first lever and which is connected at the other of said opposite end portions to an operating lever provided in a passengers' compartment of the vehicle.

3. A parking brake device according to claim 1, wherein said first lever is engaged at an engaged portion thereof with said first arcuate brake shoe, and wherein a distance between said connected portion and said connecting pin is at least five times as large as a distance between said engaged portion and said connecting pin.

4. A parking brake device according to claim 1, wherein said operable member applies a force to said first lever such that said force acts on said first lever in a force-acting direction that is inclined with respect to a plane parallel to said backing plate by an angle of 5°–30° toward a longitudinally-extending center line of the body of the vehicle.

5. A parking brake device according to claim 1, wherein said operable member applies a tensile force to said first lever such that said tensile force acts on said first lever in a force-acting direction that is inclined with respect to a plane parallel to said backing plate by an angle of 5°–30° in such a direction that causes said first lever to be forced toward a longitudinally-extending center line of the body of the vehicle when said tensile force is applied to said first lever by said operable member.

6. A parking brake device according to claim 4, wherein said connected portion is positioned such that said direction is substantially perpendicular to a straight line connecting said connected portion and said connecting pin.

7. A parking brake device according to claim 1, wherein said operable member applies a force to said first lever such that said force acts on said first lever in a force-acting direction that is substantially perpendicular to a plane parallel to said backing plate.

* * * * *